Jan 6, 1931.  A. THIBAULT  1,787,802
HEDGE TRIMMER
Filed Nov. 1, 1929   2 Sheets-Sheet 1
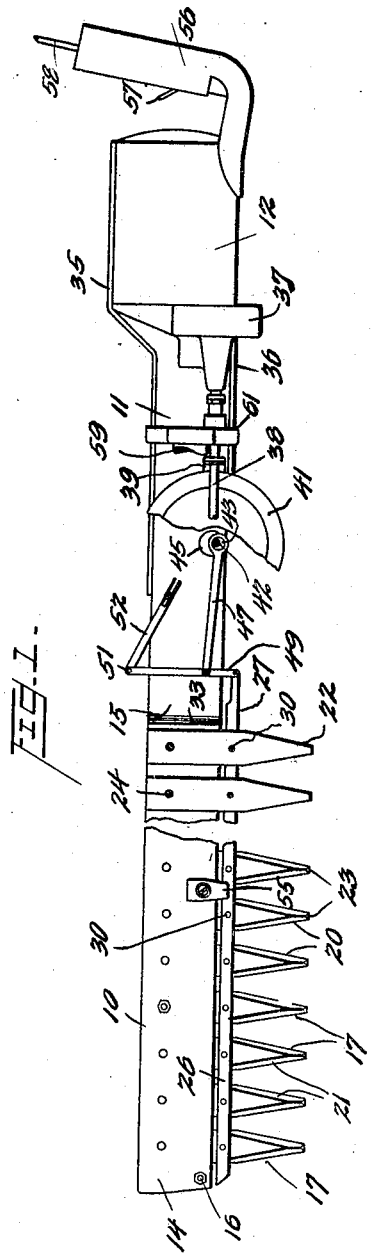
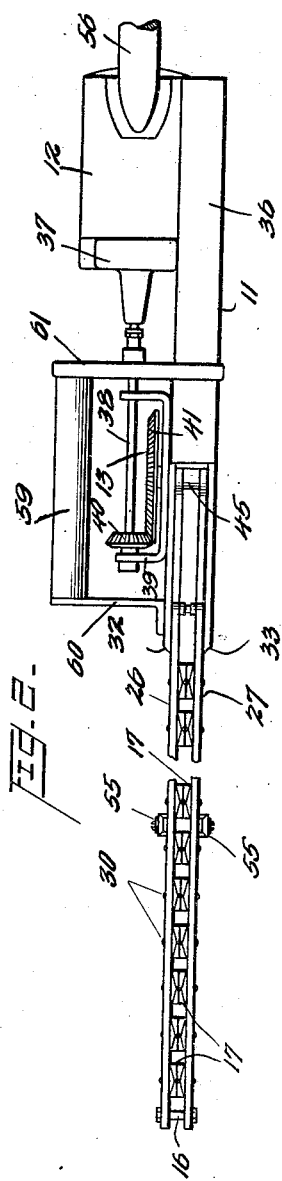
Inventor,
By Adelbert Thibault
Watson, Coit, Morse & Grindle
Attorneys.

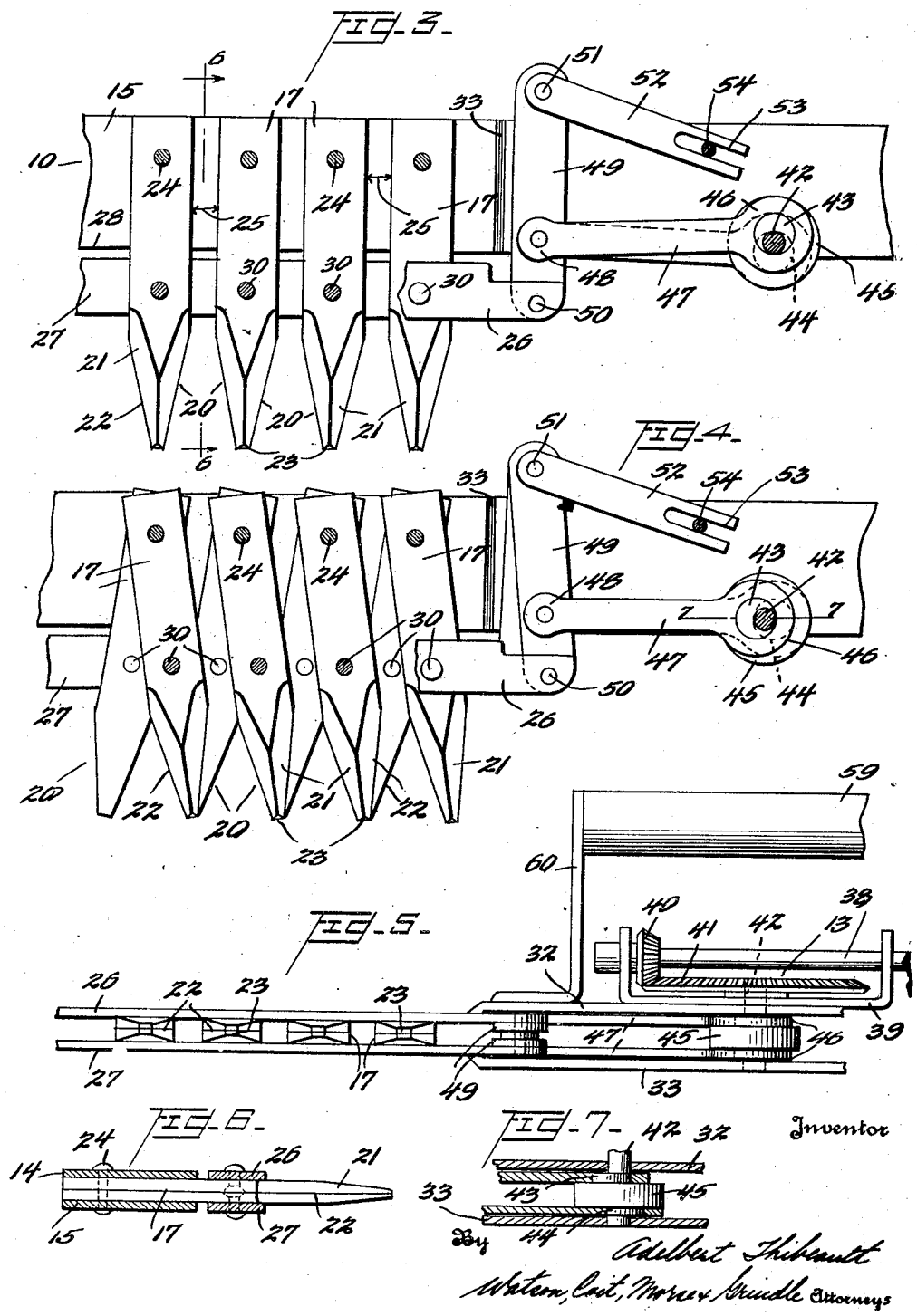

Patented Jan. 6, 1931

1,787,802

UNITED STATES PATENT OFFICE

ADELBERT THIBAULT, OF NEW BEDFORD, MASSACHUSETTS, ASSIGNOR OF ONE-THIRD TO JEAN BAPTISTE FORTIN AND ONE-THIRD TO MAXIME BONIN, BOTH OF NEW BEDFORD, MASSACHUSETTS

HEDGE TRIMMER

Application filed November 1, 1929. Serial No. 404,076.

This invention relates to agricultural apparatus and more particularly to machines of the mowing type especially for trimming hedges and shrubbery.

It is a general object of the present invention to provide a novel and improved device of the type mentioned.

More particularly it is an object of the invention to provide a hedge trimmer in which a cutter bar has directly secured thereto a power drive mechanism associated with means for reciprocating the knives of the cutter bar.

One of the important features of the invention comprises a novel arrangement of the knives of the cutter bar wherein a plurality thereof are arranged in pairs so that each knife cooperates not only with its mate but with one knife of each adjacent pair so that for each full stroke of the knives each knife makes four cuts, two with its mate and one with each adjacent knife.

Another feature of the invention resides in the provision of a motor driven hedge trimmer in which the knives are pivoted in pairs to a frame member together with means for reciprocating the knives of the pairs oppositely in sets.

A still further feature of the invention resides in a novel drive mechanism and stroke adjusting mechanism for the sickle bars of a mower.

Other and further features and objects of the invention will be more apparent to those skilled in the art upon a consideration of the accompanying drawing and following specification wherein is disclosed a single exemplary embodiment of the invention with the understanding that such changes may be made therein as fall within the scope of the appended claims without departing from the spirit of the invention.

In said drawing:

Figure 1 is a plan view of a hedge trimmer constructed according to the present invention with certain parts broken away to show interior mechanism;

Figure 2 is an edge elevation thereof;

Figure 3 is a plan view partially broken away, of a portion of the cutting knife mechanism and driving linkage;

Figure 4 is a view similar to Figure 3 with the knives in different positions;

Figure 5 is an enlarged edge view showing the knives and their driving mechanism;

Figure 6 is a section, on line 6—6 of Figure 3, through the cutter bar; and

Figure 7 is a section, on line 7—7 of Figure 4, showing the driving eccentrics.

The present invention is particularly disclosed in connection with a portable or hand type hedge trimmer although it will be appreciated that certain features of the invention are equally applicable to various types of harvesting and mowing machinery. The present embodiment of the invention provides a convenient and lightweight mechanism which can be operated by one man for trimming hedges, both the top and vertical sides being reached with equal facility and curves and rounded portions being cut with ease.

Referring to the drawings there is disclosed at 10 that portion of the apparatus generally termed a cutter bar, at 11 a frame construction, at 12 the driving motor, and at 13 the speed reducing and motion changing mechanism for connecting the motor to the sickles of the cutter bar.

The cutter bar proper is formed from the upper and lower frame members 14 and 15 respectively. These members comprise thin, elongated plates of suitable metal spaced apart as by spacer members 16 and carrying between them the inner ends of a plurality of cutter blades 17 which are arranged in cooperating pairs as best seen in Figures 3-6 inclusive.

Each blade 17 is composed of a bar of suitable metal rectangular in cross section. About one-half the length of each knife is received between the frame members or plates 14 and 15. The outer or exposed ends of the knives are sharpened to a tapered point by cutting away the sides as at 20 and applying the bevels 21 to the upper faces thereof. This provides a blade sharpened to provide the edges 22 which are not of the knife variety but rather of the shear type and tips which are not entirely pointed as seen at 23 for the sake of added strength. Each knife has its true cutting edges in the same plane as one face thereof and the knives are arranged in pairs with these cutting face planes together. Each pair of knives is pivoted together and to the frame plates 14 and 15, between which it fits, by means of a bolt or pivot member 24 which passes through the plates and suitable openings near the ends of the knives remote from the cutting edges. The spacing of the plate members is such that the knives are free to move on the pivots with a shearing motion and yet are sufficiently tightly held together to cut properly. The pairs of knives are spaced longitudinally along between the plate members with the distances 25 between pairs about equal to one-half the width of a knife blade.

Co-planar with the frame members and toward the cutting edges of the knives are the sickle bars 26, 27 spaced a slight distance from the front edges 28 of the frame members. These sickle bars are long strips of suitable metal which rest on the outer faces of the knives and are pivoted thereto as at 30 by suitable pivot members. Each sickle bar is attached only to one knife of each pair or in other words, to all of the knives on one side of the cutting plane which may be defined as the plane lying between the knives of each pair. As seen in Figure 3 the connections between the knives, the frame members, and the sickle bars is such that the knives can all be arranged at right angles to the longitudinal axis of the frame and still have the knives of each pair in exact overlapping relation. The close spacing of the knives permits each knife to cut not only with its mate but with the mates of the knives on each side of it. This is clearly shown in Figure 4 where the knives on one side of the cutting plane have been shifted with their cutting edges in one direction and those on the other side of the plane shifted with their cutting edges in the opposite direction, this being performed by oppositely moving sickle bars. Here each knife above the cutting plane is shown to be co-operating with a knife below the cutting plane of the bar to its right and vice versa. It will be seen from this arrangement that starting with the position of the knives shown in Figure 3, moving them to the position of Figure 4, back to the position of Figure 3, to the position directly opposite that of Figure 4, and back to the position of Figure 3 that each knife will make four cuts, two with each of its cutting edges, one when that edge engages the opposite cutting edge of its mate, and one when it engages the adjacent cutting edge of the mate of the knife nearest to it.

The knives are adapted to be moved through the cycle just described by suitable power means such for instance, as the electric motor 12 which is shown as mounted at the far end of the frame which is formed by offsetting the frame members 14 and 15 as shown at 32 and 33 and extending them longitudinally from the knives. The motor 12 is mounted directly on the extension 33 of the plate 15 which is attached by the side plates 35 and 36 to the plate 14 which, however, is cut away at the end of the motor to allow the motor to fit between the side plates 35 and 36 and on the extension 33 of plate 15 and to be secured in any suitable manner. The motor may conveniently be provided with a built-in speed reducing mechanism 37 such as on certain types of portable electric drills. The extension shaft 38 is secured to the shaft merging from the speed reducing gearing and is journalled in the legs of a U-shaped bracket 39 attached to the upper surface of the top frame plate 14 on the offset portion thereof. At the far end this shaft carries the miter pinion 40 which meshes with the miter wheel 41 mounted on a shaft 42 which passes through the offset portions 32 and 33 of both the plates 14 and 15. This shaft 42 is formed preferably integral with the pair of eccentrics 43, 44 spaced apart by a centrally disposed disc 45 so that the eccentrics lie against the inner faces of the extension parts 32 and 33.

Journalled on each eccentric is the looped end 46 of an eccentric rod 47 whose opposite end 48 is pivoted intermediate the ends of a link 49, the lower end of which is pivoted at 50 to the end of one of the sickle bars 26, 27. The opposite end of each link 49 is pivoted at 51 to each of the second links 52, the far ends of which are slotted as at 53 and pass over bolts 54 having heads bearing against the links adjacent the slot and portions passing through the adjacent parts of the frame members with tightening nuts on the outside.

The two eccentrics are disposed 180° apart on the shaft 42 and by the identical construction of the eccentric rods produce opposite reciprocation or oscillation of the sickle bars to produce the cutting effect already described. The linkages for connecting the eccentrics to the sickle bars are such as to give the bars a greater movement, in the normal adjustment, than the throw of the eccentric. The range of stroke of the sickle bars and hence of the knives can be regulated to some degree by adjusting the links 52 by loosening the fastening bolts 54 and sliding the links to change the positions of the fixed ends 51 of the links 49 and thus to change the angle through which these links operate.

In Figures 1 and 2 are shown the guides 55 secured to and extending out beyond the edges 28 of the frame members, and bearing on the outer faces of the sickle bars to serve as guides and to assist in holding the sickle bars and thus the knives of each pair toward each other to produce an adequate shearing action.

The motor may conveniently be provided with a handle of the pistol grip type 56 which can conveniently have a trigger 57 for controlling the flow of current to the motor which is supplied through the conductor 58. This handle is intended to be grasped by the operator's left hand while the right hand grasps the handle 59 which is comprised of a bar or rod extending parallel to the frame members and held by the brackets 60 and 61 above the miter gears.

With the device just described very excellent results can be produced because of the number of cuts per knife per cycle of operation. By having two sets of knives reciprocating oppositely it is not necessary to provide any stationary shear members or guides and the whole apparatus can be materially reduced in weight for added portability. It will be evident that one of the frame plate members can easily be dispensed with and the other can be made considerably smaller and lighter than shown. As a matter of fact the knives could be mounted solely on the sickle bars and pivoted together at their far ends and would function in exactly the manner described, but for rigidity it is advisable to have at least one frame member to maintain the pivoted ends of the knife pairs in the same plane in spite of wear on the pivots at the sickle bar connections. The whole device is extremely simple in construction and operation and can be constructed at a low cost.

Having thus described the invention, what is claimed as new and desired to be secured by Letters Patent is:

1. A cutter bar including in combination, a pair of spaced frame members, a plurality of knives arranged in cooperating pairs spaced from each other along and between said members, the inner ends of the knives of each pair being pivoted together and to said members, one knife of each pair being pivoted intermediate its ends to a sickle bar and the other knife of each pair being similarly pivoted to another sickle bar and means to oscillate said sickle bars oppositely.

2. A cutter bar including in combination, a frame member, a plurality of elongated knives arranged in cooperating pairs spaced along said member, the inner ends of the knives of each pair being pivoted together and to said member, all of the knives on one side of the cutting plane being pivoted intermediate their ends to a sickle bar and those on the opposite side of the plane being pivoted similarly to a second sickle bar, means to oscillate said sickle bars oppositely and cutting edges on said knives so that each cooperates twice with its mate and once with the mate of each adjacent knife in each full cycle of both sickle bars.

3. In a hedge trimmer, in combination, a frame member, a plurality of elongated knives arranged in cooperating pairs spaced along said member, the inner ends of the knives of each pair being pivoted together and to said member, all of the knives on one side of the cutting plane being pivoted intermediate their ends to a sickle bar and those on the opposite side of the plane being pivoted similarly to a second sickle bar, a motor mounted at one end of said frame, mechanism associated with said motor to oscillate said sickle bars oppositely and means to adjust the position of each sickle bar in relation to the frame.

4. In a portable hedge trimmer, in combination, a prime mover having a carrying handle, a frame member extending from said prime mover parallel to the shaft thereof, a plurality of elongated knives spaced along said member and extending transversely thereof, the sharpened ends of said knives extending beyond the edge of said member and the opposite ends being pivoted to the member, a sickle bar pivoted to each knife near the sharpened end thereof, a gear wheel pivoted to said frame member, a cooperating pinion on the prime mover shaft, a pitman driven by said gear wheel, a link pivoted at one end to said sickle bar, said pitman being pivoted to said link intermediate its ends and means to adjustably pivot the opposite end of said link to said frame member whereby the range of the stroke of said knives can be regulated.

5. In a portable hedge trimmer, in combination, a prime mover having a carrying handle, a frame member extending from said prime mover parallel to the shaft thereof, a plurality of elongated knives spaced along said member and extending transversely thereof, the sharpened ends of said knives extending beyond the edge of said member and the opposite ends being pivoted to the member, a sickle bar pivoted to each knife near the sharpened end thereof, a gear wheel pivoted to said frame member, a cooperating pinion on the prime mover shaft, a pitman driven by said gear wheel, a link pivoted at one end to said sickle bar, said pitman being pivoted to said link intermediate its ends, a second link having one end pivoted to the opposite end of said first mentioned link and means to adjustably secure the opposite end of said second link to said frame member.

6. In a cutter bar, in combination, a plurality of long knives each having a tapered end sharpened on two edges, said knives being arranged in pairs pivoted together to cut as shears, said pairs being mounted beside each other to cut in the same plane, the spacing between pairs being such that a knife of one pair can cooperate with its mate and the opposing knives of the adjacent pairs and means to drive the knives at one side of the plane in opposite reciprocations.

7. In a hedge trimmer, in combination, a pair of spaced frame plates, a plurality of long knives each having a tapered end sharpened on two edges, said knives being arranged in pairs pivoted together and to said plates, the pivoted ends being between the plates, and the sharpened ends projecting from between them, said pairs being arranged beside each other to cut in the same plane, a sickle bar parallel to and beyond each frame plate and each pivoted to the blades at one side of the plane, means to reciprocate said bars and means to guide said bars to move in the planes of said plates.

8. In a hedge trimmer, in combination, a pair of spaced frame plates, a plurality of long knives each having a tapered end sharpened on two edges, said knives being arranged in pairs pivoted together and to said plates, the pivoted ends being between the plates, and the sharpened ends projecting from between them, said pairs being arranged beside each other to cut in the same plane, the spacing between pairs being such that each knife of each pair cooperates at times with the opposing knives of the two adjacent pairs, a sickle bar parallel to each frame plate and each pivoted to all of the blades at one side of said cutting plane, a motor carried by one of said frame members and mechanism associating said motor and sickle bars to reciprocate them in opposition.

In testimony whereof I hereunto affix my signature.

ADELBERT THIBAULT.